US009203334B2

(12) United States Patent
Sakamoto et al.

(10) Patent No.: US 9,203,334 B2
(45) Date of Patent: Dec. 1, 2015

(54) WIND POWER GENERATOR SYSTEM, AND CONTROL METHOD FOR THE SAME

(75) Inventors: Kiyoshi Sakamoto, Hitachinaka (JP);
Takuji Yanagibashi, Hitachinaka (JP);
Tsutomu Hasegawa, Hitachi (JP);
Masaya Ichinose, Hitachiota (JP);
Takashi Matsunobu, Tsuchiura (JP);
Kenichi Azegami, Tokyo (JP); Noriyuki Uchiyama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 320 days.

(21) Appl. No.: 13/807,709

(22) PCT Filed: Jun. 30, 2010

(86) PCT No.: PCT/JP2010/004299
§ 371 (c)(1),
(2), (4) Date: Dec. 28, 2012

(87) PCT Pub. No.: WO2012/001739
PCT Pub. Date: Jan. 5, 2012

(65) Prior Publication Data
US 2013/0113212 A1    May 9, 2013

(51) Int. Cl.
*H02P 9/04* (2006.01)
*H02P 9/38* (2006.01)
(Continued)

(52) U.S. Cl.
CPC *H02P 9/38* (2013.01); *F03D 9/003* (2013.01);
*H02J 3/386* (2013.01); *H02J 9/062* (2013.01);
*H02P 9/48* (2013.01); *F05B 2270/107*
(2013.01); *F05B 2270/10711* (2013.01); *F05B 2270/337* (2013.01); *H02P 9/007* (2013.01);

(Continued)

(58) Field of Classification Search
CPC ............... F05B 2270/107; F05B 2270/10711
USPC ...................................................... 290/44, 55
See application file for complete search history.

(56) References Cited

U.S. PATENT DOCUMENTS 3,934,163 A * 1/1976 Mailfert .......................... 310/10
5,105,177 A * 4/1992 Tada et al. ..................... 335/216
(Continued)

FOREIGN PATENT DOCUMENTS

DE    20 2004 009 071 U1    9/2004
EP        2 166 225 A1       3/2010
(Continued)

OTHER PUBLICATIONS

Corresponding International Search Report with English Translation dated Sep. 28, 2010 (seven (7) pages).
(Continued)

*Primary Examiner* — Tho D Ta
(74) *Attorney, Agent, or Firm* — Crowell & Moring LLP

(57) ABSTRACT

This invention is intended to provide a wind power generator system or method for controlling a wind power generator system, designed to implement switching-initiated smooth energy changeover without leading to a complex system configuration. The method of controlling a wind power generator system according to an aspect of the invention, wherein the generator system includes a wind turbine that uses wind to generate electric power and a control device that controls the wind turbine, is a control method designed so that when the wind turbine is generating power, the turbine drives the control device by use of the turbine-generated power, irrespective of an electric power system state.

8 Claims, 12 Drawing Sheets

(51) Int. Cl.
*F03D 9/00* (2006.01)
*H02P 9/48* (2006.01)
*H02J 3/38* (2006.01)
*H02J 9/06* (2006.01)
*H02P 9/00* (2006.01)

(52) U.S. Cl.
CPC ............... *Y02B 10/72* (2013.01); *Y02E 10/72* (2013.01); *Y02E 10/763* (2013.01); *Y02E 10/766* (2013.01)

(56) References Cited

U.S. PATENT DOCUMENTS

| | | | |
|---|---|---|---|
| 6,921,985 | B2 | 7/2005 | Janssen et al. |
| 7,115,066 | B1* | 10/2006 | Lee .................................. 477/15 |
| 7,709,972 | B2* | 5/2010 | Arinaga et al. ................. 290/55 |
| 8,084,874 | B2* | 12/2011 | Llorente Gonzalez ......... 290/44 |
| 8,116,914 | B2 | 2/2012 | Oohara et al. |
| 8,258,906 | B2* | 9/2012 | Sivasubramaniam et al. ............................. 335/284 |
| 2007/0216165 | A1 | 9/2007 | Oohara et al. |
| 2011/0057443 | A1 | 3/2011 | Rivas et al. |

FOREIGN PATENT DOCUMENTS

| | | | |
|---|---|---|---|
| JP | 8-322297 | A | 12/1996 |
| JP | 2001-190096 | A | 7/2001 |
| JP | 2003-129935 | A | 5/2003 |
| JP | 2007-239599 | A | 9/2007 |
| JP | 2007-252028 | A | 9/2007 |
| JP | 2008-75521 | A | 4/2008 |
| JP | 2008-104286 | A | 5/2008 |
| JP | 2009-533011 | A | 9/2009 |
| JP | 2011-211817 | A | 10/2011 |

OTHER PUBLICATIONS

Corresponding International Search Report dated Apr. 17, 2012 of copending PCT International Application No. PCT/JP2012/000248 (U.S. Appl. No. 14/372,949), with English translation (five (5) pages).

U.S. Appl No. 14/372,949, filed Jul. 17, 2014.

Erich Hau: '*Wind Turbines. Fundamentals, Technologies, Application, Economics*,' Dec. 31, 2006, Springer-Verlag, ISBN: 978-3-540-24240-6, Chapter 9, pp. 348-351, XP002723125.

* cited by examiner

WIND POWER GENERATOR SYSTEM, AND CONTROL METHOD FOR THE SAME

TECHNICAL FIELD

The present invention relates generally to wind power generator systems and to control methods for the same. More particular, the invention is directed to an electric power source for control.

BACKGROUND ART

Wind power generator systems, along with solar power generator systems, are catching great attention as a means of producing renewable energy. Wind power generator systems generate electric power by rotationally driving a blade(s) with the aid of wind force and rotating a rotor of an electrical energy generator using the energy generated by the rotational driving of the blade. During power-generating operation, these systems control the pitch angle, rotational angle in a horizontal direction, and other parameters of the blade, according to wind direction and wind speed, to use the force of the wind more efficiently for power generation. The control devices that perform wind turbine control functions including such control are called auxiliary machines, and a power source for driving the auxiliary machines is generally covered by the electric power supplied from power systems.

In the case where as discussed above, the driving power source for auxiliary machines is covered by the electric power supplied from a power system, a significant drop in the voltage of the power system due to a lightning strike, a grounding fault, or the like, will render unobtainable the driving power source for the auxiliary machines, resulting in continued driving thereof being impossible. If the driving of the auxiliary machines cannot be continued, the power-generating operation itself will also be difficult to continue. However, if the wind power generator system, the power supply source, becomes unable to generate power with each occurrence of a lightning strike, a grounding fault, or the like, this will make stabilized supply of power difficult. For this reason, wind power generator systems are desired to have an LVRT (Low Voltage Ride Through) function that also makes the generator system resistant to such a voltage drop at the power system side.

In connection with this, Patent Documents 1 and 2, for example, describe wind turbine generators that implement such an LVRT function as above.

It is described in Patent Document 1 that if such voltage dips as discussed above occur in a power system, uninterruptible power supplies (UPS's) are used to cover the power required for auxiliary machines.

Patent Document 2 describes a wind turbine power generator system including an emergency power supply system equipped with an emergency power generator and an emergency changeover switch, the generator system being configured so that if an unusual event of a system voltage dip occurs, the emergency changeover switch has its operating position changed to power a pitch control mechanism, a main control device, and the like, from the emergency power supply system.

PRIOR ART LITERATURE

Patent Documents

Patent Document 1: U.S. Pat. No. 6,921,985
Patent Document 2: JP-2007-239599-A

SUMMARY OF THE INVENTION

Problems to be Solved by the Invention

The power generator system in Patent Document 1, however, could be complex in configuration since UPS's are absolutely necessary for response to unusual events at the power system side.

Referring to the power generator system in Patent Document 2, on the other hand, when the power system is normal, auxiliary machines are powered only from the power system, and when power is to be switched, there is a need to change the electrical energy to that obtained from the wind turbine currently in operation. This has been liable to render a smooth energy changeover difficult, or to make the power generator system too complex in configuration to achieve the smooth changeover.

Accordingly, an object of the present invention is to implement a switching-initiated smooth energy changeover without leading to a complex system configuration.

Means for Solving the Problems

In order to solve the above problems, a method of controlling a wind power generator system according to an aspect of the present invention, wherein the generator system includes a wind turbine that uses wind to generate electric power, and a control device that controls the wind turbine, is a control method designed so that when the wind turbine is generating power, the control device is driven by the turbine-generated power, irrespective of a power system state.

In order to solve the above problems, a wind power generator system according to another aspect of the present invention comprises: a wind turbine including, in addition to a bladed rotor that uses wind to rotate, a power generator that generates electric power by rotating a rotor of the generator by a rotating force of the bladed rotor; and a control device that controls the wind turbine; wherein the power generator includes a main coil and auxiliary coil, in which supply power to an electric power system is generated, and the power generated in the main coil or power supplied from the power system, and the power generated in the auxiliary coil are electrically coupled to each other, the sets of electrically coupled power being used to drive the control device.

Effects of the Invention

The present invention implements the switching-initiated smooth energy changeover without leading to a complex system configuration.

MODES FOR CARRYING OUT THE INVENTION

Hereunder, embodiments of the present invention will be described.

First Embodiment

A first embodiment of the present invention is described below using FIGS. 1 to 4.

Figure 1:
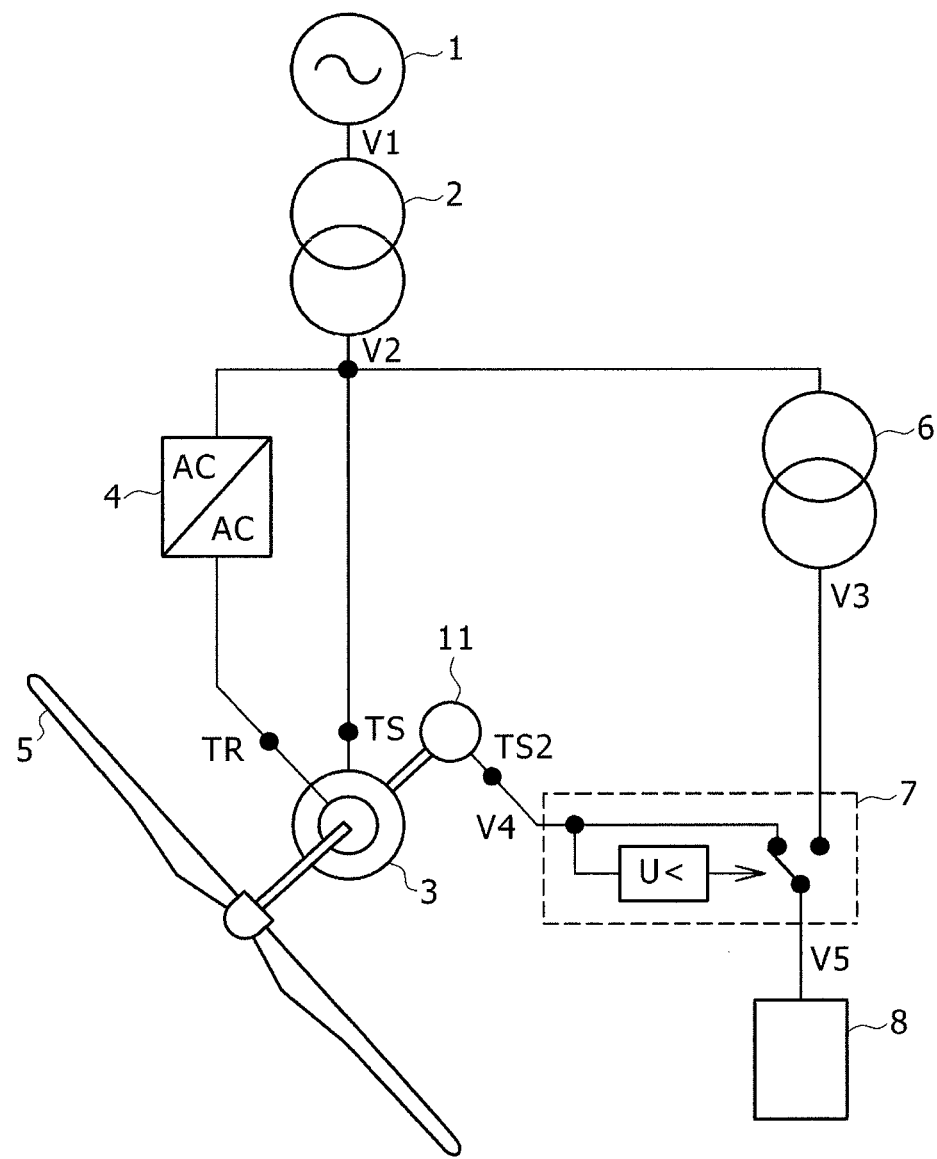
FIG. 1 is a single-line electrical diagram of a wind power generator system according to a first embodiment.

As shown in FIG. 1, a wind power generator system according to the present embodiment schematically includes: a wind turbine with a bladed rotor 5, that generates electrical energy with an aid of wind; an auxiliary machine 8, which herein refers collectively to various devices that control the wind turbine; a main transformer 2 connected to an electric power system 1; an auxiliary-machine power transformer 6 connected between the main transformer 2 and the auxiliary machine 8; and a switch 7 for switching a side electrically coupled to the auxiliary machine 8.

As shown in FIG. 1, the electric power system 1 is connected to a high-voltage (V1) terminal of the main transformer 2. A stator coil terminal TS of an electric power generator 3, an electric power control device 4, and a high-voltage (V2) terminal of the auxiliary-machine power transformer 6 are connected to a low-voltage (V2) terminal of the main transformer 2. The auxiliary machine 8 is connected to a low-voltage terminal of the auxiliary-machine power transformer 6 via the switch 7. The auxiliary machine 8 is also connected to a coil terminal TS2 of an auxiliary electric power generator 11 via the switch 7.

Figure 2:
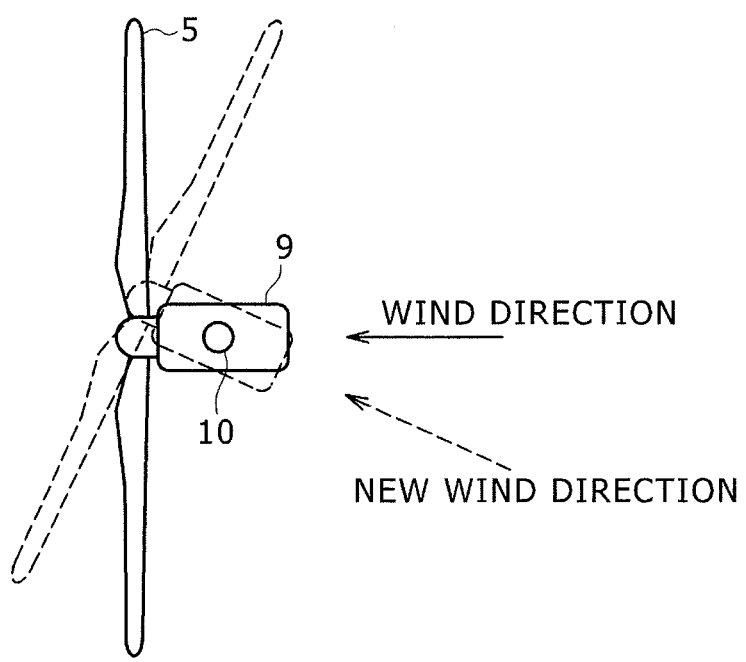
FIG. 2 is a top view of a wind turbine in the first embodiment, showing the way the turbine rotates about a support column according to wind direction.

Constituent elements of the wind turbine are described below using FIG. 2. The turbine is constituted mainly of the bladed rotor 5, a nacelle 9 for mounting therein the power generator 3 that the bladed rotor 5 rotates, a support column 10 for supporting the turbine connected to the nacelle 9, and the auxiliary power generator 11. The bladed rotor 5 is formed from three blades equally arranged at angle intervals of 120 degrees when viewed from the front of the turbine. In addition to the power generator 3 and the auxiliary power generator 11, a device that controls a rotational angle of the turbine is accommodated in the nacelle 9. The turbine is constructed to rotate through 360 degrees in a horizontal direction about the support column 10, causing the nacelle 9 to rotate according to wind direction. More efficient power generation is possible by pointing the bladed rotor 5 in a direction that it can catch more of the wind's energy. The wind turbine comes in either a configuration with the bladed rotor 5 positioned upwind when viewed from the support column 10, or a configuration with the bladed rotor 5 positioned downwind. FIG. 2 shows an example of a downwind turbine having the bladed rotor 5 positioned downwind when viewed from the support column 10. The downwind turbine structurally features free yaw control. Free yaw control means changing the rotational angle of the turbine with the aid of the wind force, instead of using rotational motive power. A pitch angle control device controls a tilt of each single blade constituting the bladed rotor 5. Increasing/decreasing an area through which the blades can capture the wind allows the energy of the wind to be converted into rotation of the bladed rotor 5 efficiently. Conversely, in strong winds, minimizing the swept blade area allows the rotation of the bladed rotor 5 to be stopped. Combining the rotational angle control of the nacelle and the pitch angle control of the blades enables a position of the bladed rotor 5 and the blades to be changed efficiently with respect to the wind direction, and consequently, power generation to be made more efficient or the wind turbine to be stopped. The auxiliary machine 8 shown in FIG. 1 includes the rotational angle control device and the pitch angle control device. The power generator 3 is connected at its rotor coil terminal TR to the low-voltage terminal of the main transformer 2 via the power control device 4. The power generator 3 is connected at its rotor (not shown) to the bladed rotor 5. When the bladed rotor 5 rotates with the aid of wind, the rotor also rotates. The power generator 3 in the present embodiment is an AC power generator of a secondary excitation type (doubly-fed ac power generator). The power control device 4 is connected to the rotor coil terminal TR of the power generator 3, and as described above, the low-voltage (V2) terminal of the main transformer 2 is connected to the power control device 4. That is to say, an excitation current for power generation is conducted from the power system 1 into the rotor via the power control device 4. Thus, as the bladed rotor 5 gets the wind force and rotates, the rotor starts rotating and a magnetic field changes, which results in an induced electromotive force occurring primarily at the stator side and hence the power generator 3 starting to generate electricity. As described above, the stator coil terminal TS is connected to the power system 1 via the main transformer 2, and generated power is transmitted to the power system 1. The wind turbine in the present embodiment additionally includes the auxiliary power generator 11, and as the bladed rotor 5 gets the wind force and rotates, the auxiliary power generator 11 also starts to rotate its own rotor with the rotor of the power generator 3 and generate electricity. The auxiliary power generator 11 is connected at its output terminal TS2 to the switch 7.

Figure 3:
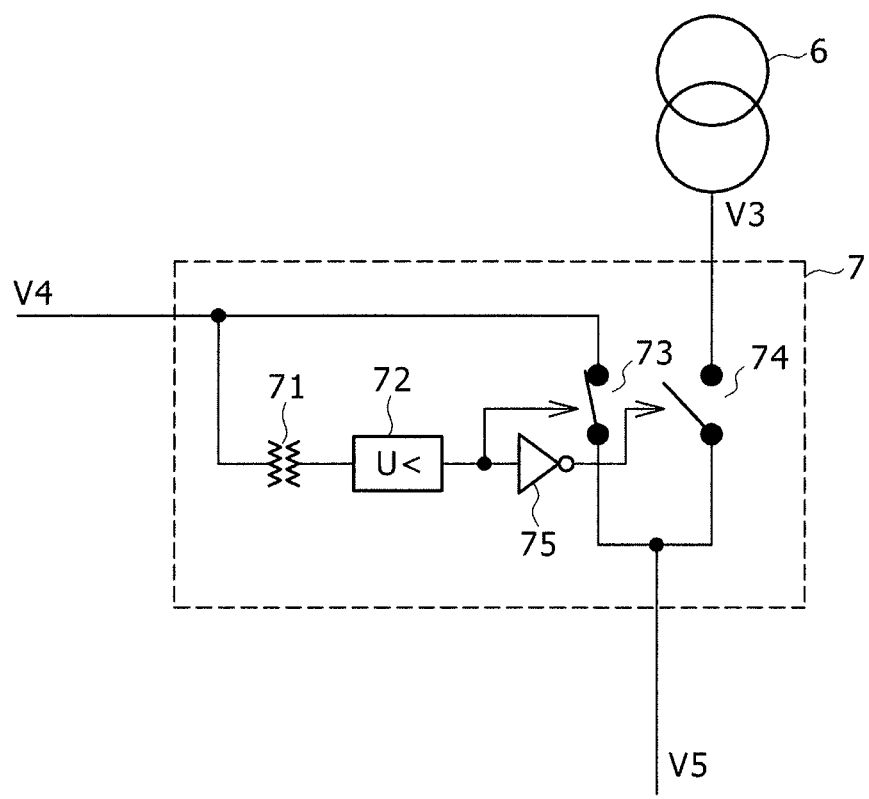
FIG. 3 is a detailed diagram of a switch 7 used in the first embodiment.

Internal constituent elements of the switch 7 are described below using FIG. 3. An instrument transformer 71, a control device 72, a switch circuit 73, a switch circuit 74, and a signal logic inverter 75 are included in the switch 7. Inside the switch 7, the instrument transformer 71 detects a voltage developed across the TS2 terminal of the auxiliary power generator 11. The control device 72 that determines whether an undervoltage state is occurring is connected to the secondary-side terminal of the instrument transformer 71. Opening/closing of the switch circuit 73 is controlled by an output signal of the control device 72. The logic inverter 75 inverts logic of the output signal of the control device 72 and thereby controls opening/closing of the switch circuit 74. That is to say, the switch circuits 73 and 74 operate complementarily. The switch 7 controls the operation of the switch circuits 73, 74. If a voltage V4 is equal to or higher than a predetermined value, the switch 73 is controlled to turn on and the switch 74 is controlled to turn off. If the voltage V4 is lower than the predetermined value, the switch 73 is controlled to turn off and the switch 74 to turn on. While using the terminal voltage TS2 of the auxiliary power generator 11 has been described as an example of a criterion for switching between the switch circuits 73, 74, generator speed information or wind speed information may be used instead.

Voltages of the elements shown in FIG. 1 are described below. In the present embodiment, the main transformer 2 and the auxiliary-machine power transformer 6 exist, and these transformers handle AC voltages different in voltage signal amplitude. The voltage V1 between the power system 1 and the main transformer 2 ranges nearly between 6 and 33 kV inclusive. This voltage range falls under Japanese domestic division of high voltages and extrahigh voltages. The voltage V2 between the main transformer 2 and the power generator 3 ranges nearly between 600 and 1,500 V inclusive, under a general scheme. The voltage that the power generator 3 has generated is stepped up to a voltage level suitable for power transmission, and the main transformer 2 performs the function. The auxiliary-machine power transformer 6, connected to the low-voltage terminal of the main transformer 2, steps down the voltage V2. The auxiliary-machine power transformer 6 may instead step down the voltage V1 developed between the power system 1 and the main transformer 2. Since the low-voltage terminal voltage V3 of the auxiliary-machine power transformer 6 needs only to have a voltage value that the auxiliary machine 8 requires, the voltage V3 is set to be a low voltage of 400 V or less. The voltage values and voltage ranges here have been shown as an aid for understanding the present specification, and obviously do not limit an operating range of the present invention.

Next, a manner of controlling the wind power generator system according to the present embodiment is described below using a timing chart of FIG. 4. The wind power generator system according to the present embodiment operates to generate electric power by controlling the rotational angle of the nacelle, the pitch angle of the blades, and the like, while continuously monitoring various parameters such as the wind speed and the output voltages of the power generators.

Figure 4:
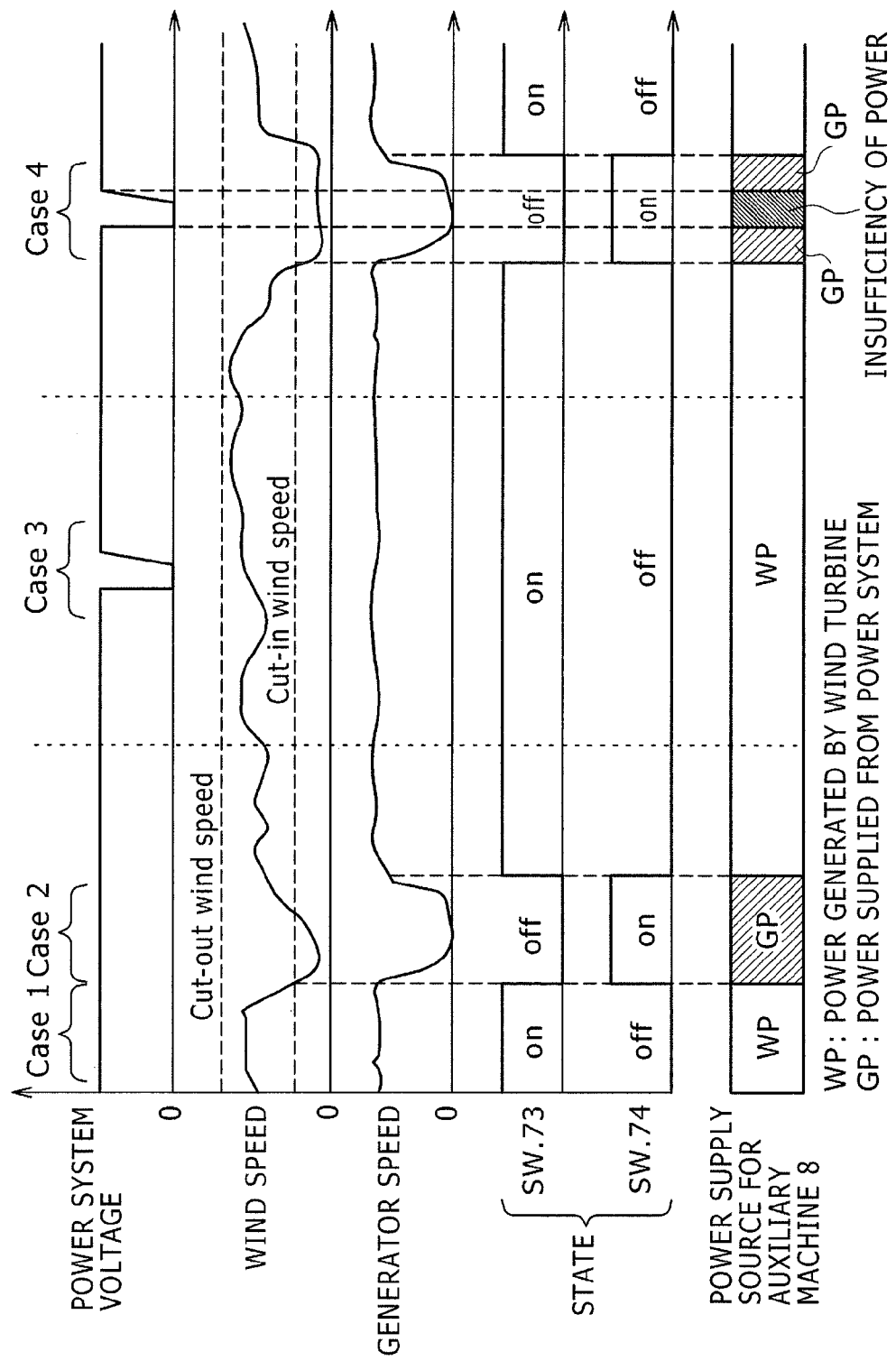
FIG. 4 is a diagram that shows time-varying changes in a state of a supply route for an auxiliary-machine power source under an abnormal state of the wind power generator system according to the first embodiment.

When the wind turbine is running within a wind speed range that enables it to generate electric power (i.e., the turbine speed is equal to at least a cut-in wind speed and also up to a cut-out wind speed), as shown in Case 1 of FIG. 4, the bladed rotor 5 is driven to activate the power generator 3 and the auxiliary power generator 11 to rotate the respective rotors, thereby the two generators generating electricity. The voltage of the power generator 3 at this time is boosted via the main transformer 2 and then transmitted to the power system 1. Meanwhile, the power generated by the auxiliary power generator 11 is transmitted from the output terminal TS2 to the switch circuit 73 within the switch 7. As described above, when the voltage V4 is equal to or higher than the predetermined value, the switch 73 is controlled to turn on and the switch 74 is controlled to turn off, so the driving power for the auxiliary machine 8 at this time is covered by the power that the auxiliary power generator 11 has generated.

When the wind turbine is running outside the wind speed range that enables it to generate electric power (i.e., the turbine speed is less than the cut-in wind speed or higher than the cut-out wind speed), as shown in Case 2 of FIG. 4, the bladed rotor 5 is in a stopped condition or is not sufficiently driven for power generation, so the turbine cannot sufficiently meet the amount of power required for the driving of the auxiliary machine 8. When the wind speed is outside the range that enables power generation, therefore, the present embodiment changes the operating position of the appropriate switch circuit within the switch 7, to the power system 1. As described above, when the voltage V4 is lower than the predetermined value, the switch 73 is controlled to turn off and the switch 74 to turn on, so the driving power for the auxiliary machine 8 is covered by the power that the power system 1 supplies. Thus the driving of the auxiliary machine 8 is continued, even when the wind speed is outside the range that enables power generation.

In the present embodiment, since as described above, power is appropriately switched in the case that the auxiliary power generator 11 is unable to generate or supply the electric power needed to drive the auxiliary machine 8, power switching is possible, even without state adjustment before or after switching. Since there is no need to conduct state adjustments before or after switching, the switching operation becomes smoother than in a case where the turbine executes power switching while it is generating electricity.

In addition, the present embodiment has the following advantages. That is to say, if the power system 1 experiences a lightning strike, a grounding fault, or other unusual events, the power system 1 may suffer a V1 voltage dip for nearly 0.1 to 1.5 seconds. System operation in this case is shown in Cases 3 and 4 of FIG. 4. Case 3 in FIG. 4 shows the operation of the power system 1 existing when the voltage dip occurs while the turbine is running within the wind speed range that enables power generation. As described above, when the turbine is running within the wind speed range that enables power generation, the driving power for the auxiliary machine 8 is covered by the power that the auxiliary power generator 11 has generated, and the turbine state is not affected by the power system 1. Regardless of the state of the power system 1, therefore, the turbine can obtain the power necessary for driving the auxiliary machine 8, and even realize LVRT.

Case 4 in FIG. 4, on the other hand, shows the operation of the power system 1 existing when a further voltage dip occurs with the turbine overstepping the wind speed range in which it can generate electric power. As described above, when the turbine oversteps the wind speed range in which it can generate electric power, the turbine stops the power-generating operation and changes in state so that the driving power for the auxiliary machine 8 is covered by the power that the power system 1 supplies. If the voltage of the power system 1 further decreases at this time, the power supply source for the auxiliary machine 8 also decreases in voltage, thus bringing the auxiliary machine 8 into a stop. This makes LVRT unachievable. Effects of the voltage decrease upon the power system 1, however, are insignificant since the turbine originally is running outside the wind speed range that enables power generation, and since the voltage decrease is an event that arises when power generation by the wind power generator system is in a stopped condition.

Even if power generation is stopped by a gust of wind exceeding the cut-out wind speed, the present embodiment stops the operation of the auxiliary machine 8 when the voltage of the power system 1 decreases. If the downwind turbine in FIG. 2 is used in the embodiment, however, since free yaw control enables the rotational angle of the wind turbine to be changed even during the operational stoppage of the auxiliary machine 8, normal operation of the turbine is maintained without a decrease in its on-gust stand-by ability.

It has been described above that the auxiliary machine 8 refers collectively to the various devices that control the wind turbine. More specifically, the auxiliary machine 8 includes a motor drive unit for rotational angle control of the turbine, a motor drive unit for pitch angle control, an oil pump unit for circulation of a lubricating oil, and other devices that consume a relatively large amount of electric power. The auxiliary machine 8 also includes a control circuit board for the control device, and other devices that consume a relatively small amount of electric power. A supply voltage requirement relating to the devices that consume a relatively large amount of power is usually 200 to 400 V, for example. It usually suffices if a supply voltage of 100 V, for example, is supplied to the control circuit board.

Under an alternative generator system configuration, if the auxiliary machine 8 including the above devices and units is divided into two groups, this allows one of the two groups to receive power from the power system 1, and the other group to receive power from the auxiliary-machine power generator 11. In the case where only the control circuit board, which consumes a small amount of power, receives necessary power from the auxiliary-machine power generator 11, the amount of electrical energy that the auxiliary-machine power generator 11 generates can be lessened and the generator can therefore be miniaturized. If a device/unit whose fluctuations in power consumption are insignificant is selected as the device/unit that receives necessary power from the auxiliary-machine power generator 11, fluctuations in the power-receiving voltage of and from the generator 11 can be suppressed.

In addition, although in the present embodiment, magnitude of the driving power for the auxiliary machine 8 has been controlled to differ according to the particular output voltage of the auxiliary-machine power generator 11, the magnitude of the driving power for the auxiliary machine 8 may be controlled to differ according to wind speed, instead of the output voltage of the auxiliary-machine power generator 11. In that case, the magnitude of the driving power for the auxiliary machine 8 will be controlled to depend on whether the wind turbine runs within the wind speed range that enables power generation.

Furthermore, while in the present embodiment the power for the auxiliary machine 8 has been covered by the auxiliary-machine power generator 11, this may be accomplished by forming an auxiliary coil around the generator 3. Any other method that allows power generation can be used as a further substitute.

Since the wind speed usually changes progressively, not instantaneously, these changes are predictable, so that the switch in the present embodiment does not always require instantaneous opening/closing. The kind of switch, therefore, is not limited to a type capable of rapid opening/closing (e.g., a thyristor), and it can be an electromagnetic contactor.

Second Embodiment

Figure 5:
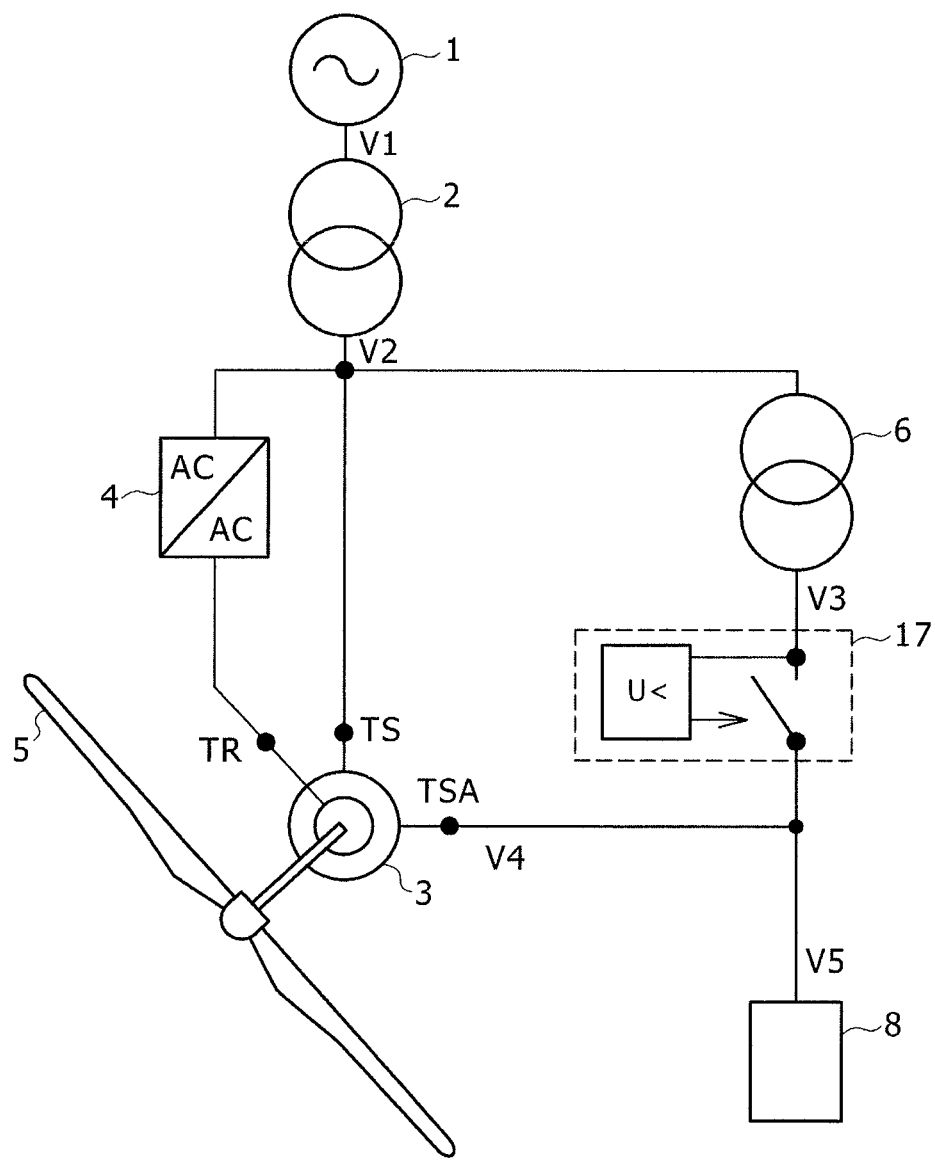
FIG. 5 is a single-line electrical diagram of a wind power generator system according to a second embodiment.
Figure 6:
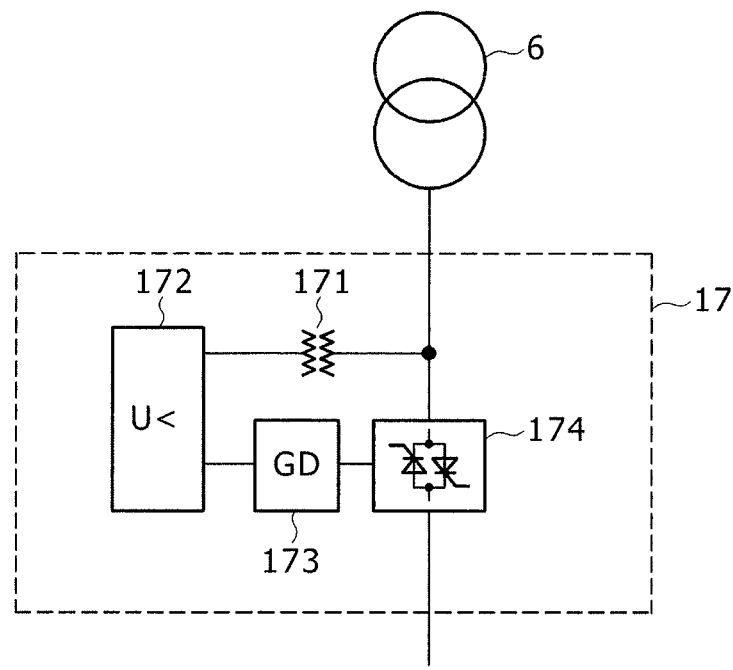
FIG. 6 is a detailed diagram of a switch 7 used in the second embodiment.

A second embodiment of the present invention is described below using FIGS. 5 to 7. The first embodiment assumes that when the wind turbine is running within the wind speed range that enables power generation, the electric power that the auxiliary power generator 11 has generated is used to cover the power required for the auxiliary machine 8, and that when the wind turbine is running outside the wind speed range that enables power generation, the electric power that the auxiliary power generator 11 has generated is used by changing the operating position of the switch 7 to cover the power required for the auxiliary machine 8. The power for the auxiliary machine 8 is therefore covered by either the power generated by the auxiliary power generator 11, or the power supplied from the power system 1.

In the present embodiment, however, an auxiliary coil is formed around the power generator 3 and an auxiliary coil terminal TSA is connected to the auxiliary machine. Additionally to these, the supply power from the power system 1 is electrically coupled to the auxiliary machine on a steady basis.

In other words, when the power system 1 is normal and the wind turbine is running within the wind speed range that enables power generation, the power for the auxiliary machine 8 is covered by either the power generated by the auxiliary power generator 11, or the power supplied from the power system 1.

In the present embodiment, differences from the first embodiment are described below. All other details and particulars of the present embodiment, except for the differences that follow, are substantially the same as those of the first embodiment, and overlapped description is omitted herein.

In the present embodiment, the power generator 3 includes the auxiliary coil, which is wound around the generator 3 in such a form as to be interlinked with internal rotating magnetic fluxes of the generator, and while an excitation current is supplied, rotor rotation of the generator 3 induces an AC current at the auxiliary coil terminal TSA. The auxiliary coil has its number of windings determined so that the generated voltage V4 induced at the auxiliary coil terminal TSA will take the voltage value (e.g., low-voltage value of 400 V or less) that is required for the auxiliary machine 8. In the present embodiment, the auxiliary coil is assembled to achieve phase matching between the voltage V4 and the low-voltage terminal voltage V3 of the auxiliary-machine power transformer 6. A more specific way to achieve phase matching is by winding the auxiliary coil of the power generator 3 around a slot having the stator coil of the generator 3 wound around the slot in advance. Winding around the same slot will result in phase matching between the AC voltage induced across the stator coil terminal TS of the generator 3 and the AC voltage induced across the terminal TSA. Additionally, since the AC voltage induced across the stator coil terminal TS of the generator 3 needs to be supplied to the power system 1, this AC voltage is controlled to match the low-voltage terminal voltage V2 of the main transformer 2 on the average. Hence, the induced voltage of the auxiliary coil wound around the same slot (i.e., the voltage across the TSA terminal) will match the voltage V2 in terms of phase. The phase of the voltage V4 and that of the voltage V3 can be matched by selecting for the auxiliary-machine power transformer 6 an electrical connection scheme that will cause no change in phase angle between the primary and secondary voltages.

Next, composition of a switch 17 is described below using FIG. 6. An instrument transformer 171, a control device 172, a gate driver 173, and a switch circuit 174 are included in the switch 17. Inside the switch 17, the instrument transformer 71 detects the voltage V3 developed across the low-voltage terminal of the auxiliary-machine power transformer 6. The control device 172 that determines whether an undervoltage state is occurring is connected to a secondary-side terminal of the instrument transformer 171. The control device 172 has its output signal coupled to the gate driver 173. The gate driver 173 drives the switch circuit 174. The switch circuit 174 shown in FIG. 6 is a thyristor switch with two antiparallel-connected thyristor elements. The switch 17 operates so that when the voltage V3 is normal, the thyristor turns on and when the voltage V3 decreases below a predetermined value, the thyristor turns off.

Other details of the switch 17 in composition are substantially the same as those of the switch 7 in the first embodiment, overlapped description of the other details being omitted herein.

Next, referring to a manner of controlling the wind power generator system according to the present embodiment, differences from the control manner in the first embodiment are described below using FIG. 7.

Figure 7:
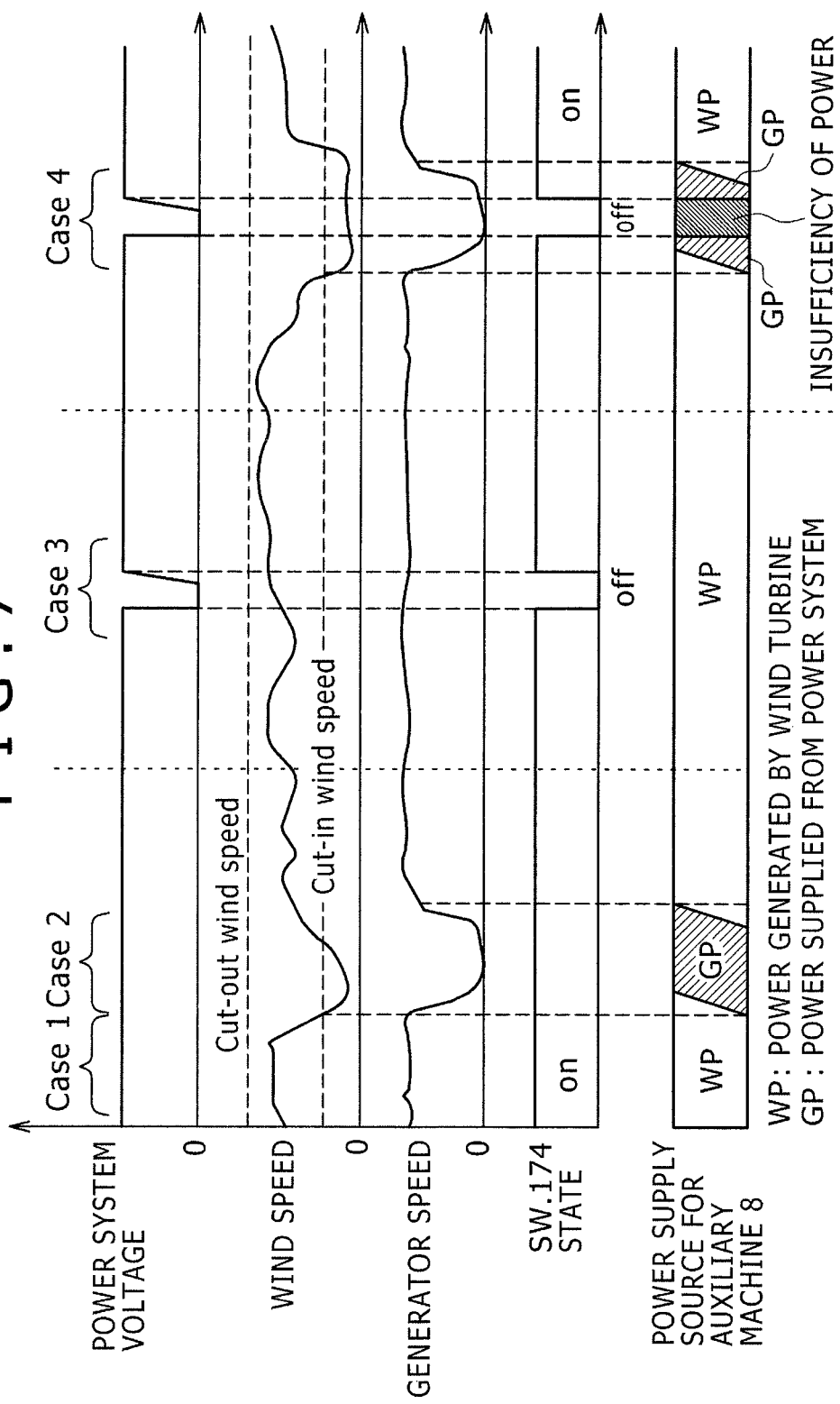
FIG. 7 is a diagram that shows time-varying changes in a state of a supply route for an auxiliary-machine power source under an abnormal state of the wind power generator system according to the second embodiment.

When the wind turbine is running within the wind speed range that enables power generation, and also the power system 1 is normal, that is, in a state denoted as Case 1 in FIG. 7, generated electric power is developed across the auxiliary coil terminal TSA and an undervoltage state is not occurring in the instrument transformer 171. In addition, the control device 172 does not command the gate driver 173 to output an 'open' signal to the switch circuit 174, and the switch circuit 174 remains closed. In the above case, therefore, the auxiliary coil terminal TSA and the voltage V3 of the power system 1 are electrically coupled and the power for the auxiliary machine 8 is covered. Under this situation, since the AC voltage across the auxiliary coil terminal TSA and the AC voltage supplied from the power system 1 are in phase as described above, no current flows between both and the auxiliary machine 8 can be powered efficiently.

Next, the case where the wind turbine is running outside the wind speed range that enables power generation, that is, the situation applying to Case 2 of FIG. 7 is described below. In this case, a sufficient amount of generated electric power is not developed across the auxiliary coil terminal TSA. While the power system 1 is normal, however, as in Case 1 of FIG. 1, an undervoltage state is not occurring in the instrument transformer 171 and hence the switch circuit 174 remains closed. When the wind turbine is running outside the wind speed range that enables power generation, therefore, the generated power that the power system 1 supplies can be used to cover the driving power for the auxiliary machine 8. The driving power for the auxiliary machine 8 is either the generated power developed across the auxiliary coil terminal, or the power from the power system 1, and a rate between both changes according to a rotating speed of the power generator, as denoted by Case 2 in FIG. 7.

In case of generator speed dip, electrically disconnecting the auxiliary coil terminal TSA and the auxiliary machine 8 from each other is more effective for reducing a loss of energy in the wind power generator system, since the current flowing from the power system 1 into the auxiliary coil terminal TSA can be reduced.

Next, a case in which a lightning strike, a grounding fault, or some other unusual event occurs to the power system 1, that is, a situation applying to Case 3 of FIG. 7 is described below. In this case, the voltage at the side of the power system 1 decreases and consequently an undervoltage state occurs in the instrument transformer 171. Upon the occurrence of this state, the control device 172 discriminates the undervoltage state and outputs a signal commanding the gate driver 173 to open the switch circuit 174. The gate driver 173 upon receiving the command signal, drives the switch circuit 174 to open. This stops the power system 1 from supplying power to the auxiliary machine 8. Even if power is not supplied from the power system 1, however, while the turbine is running within the wind speed range that enables power generation, the turbine can cover the power for driving the auxiliary machine 8 and continue the operation thereof. Hence, LVRT is realized as in the first embodiment.

When the turbine is running outside the wind speed range that enables power generation, and also the voltage of the power system 1 decreases, that is, a situation applying to Case 4 of FIG. 7, although LVRT is not realized, but as in the first embodiment, effects of the voltage decrease upon the power system 1 are insignificant, since the turbine originally is running outside the wind speed range that enables power generation, and since the voltage decrease is an event that arises under a stopped state of power generation in the wind power generator system.

In the present embodiment, during normal operation, the power supplied from the auxiliary coil terminal TSA, and the power supplied from the power system 1 are both originally used to cover the power for the auxiliary machine 8. Even if the supply power from either should ever be interrupted, therefore, switching to a new power source does not occur and the other of the two power sources continues to supply the originally supplied power. Even smoother switching than in the first embodiment is therefore implemented.

Furthermore, in the present embodiment, since both the power supplied from the auxiliary coil terminal TSA, and the power supplied from the power system 1 cover the power for the auxiliary machine 8, the phases of both need matching to supply the auxiliary machine power more efficiently. The phase of the voltage V4 and that of the low-voltage terminal voltage V3 of the auxiliary-machine power transformer 6 can be matched by using the method described above. More specifically, this method is to wind the auxiliary coil of the power generator 3 around a slot having the stator coil of the generator 3 wound around the slot in advance, and select for the auxiliary-machine power transformer 6 an electrical connection scheme that will cause no change in phase angle between the primary and secondary voltages. Use of this phase-matching method allows more efficient supply of the auxiliary machine power. Additionally, since, even without new phase control means or the like, phase matching between the auxiliary coil terminal TSA and the power system 1 is established from an initial phase of power generation, the configuration of the wind power generator system is simplified and the generator system yields a further advantage.

Besides, lightning strikes, grounding faults, and other unusual events that the power system 1 might experience are unpredictable and these events usually occur within a short time, for which reason the switch 17 is required to respond rapidly. In the present embodiment, the switch circuit 174 connected to the power system 1 via the transformers 2 and 6, includes a thyristor switch, which enables rapid switching, and use of the thyristor switch is further preferred. However, an electromagnetic contactor, although inferior in responsiveness, can be used as an alternative to the thyristor switch. While a thyristor switch has been cited as an example of a switch for rapid switching, it goes without saying that an applicable switch is not limited to a thyristor switch and that any other appropriate switch with a rapid-switching ability provides similar/equivalent advantageous effects.

Although structural simplification is unachievable, the supply of power itself can likewise be achieved by providing phase control means or the like independently after assembling the auxiliary coil under a condition that does not allow phase matching. Similarly, even when phase control means or the like is not provided and a current is flowing between a path of the supply power from the auxiliary coil terminal TSA and a path of the supply power from the power system 1, the supply of power itself, while not being efficient, can be achieved.

Third Embodiment

Figure 8:
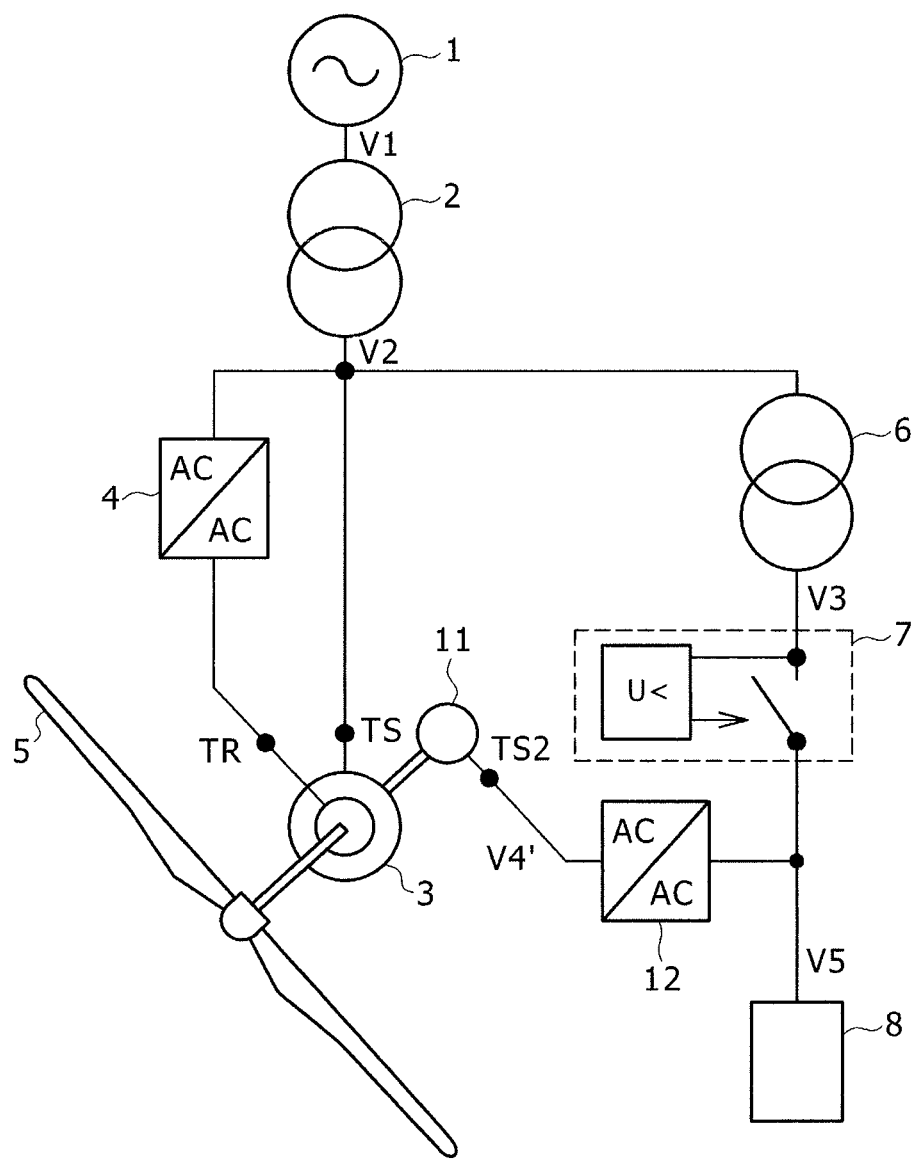
FIG. 8 is a single-line electrical diagram of a wind power generator system according to a third embodiment.
Figure 9:
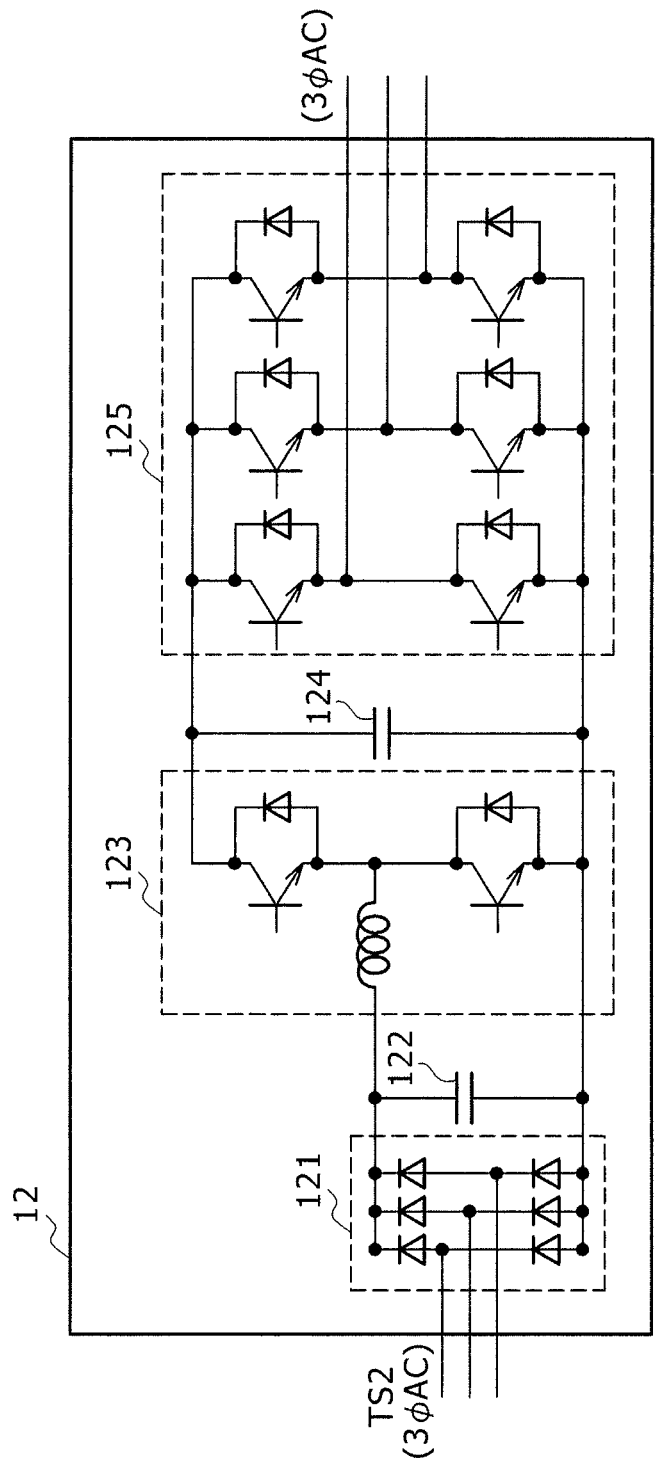
FIG. 9 is a detailed diagram of an electric power converter 12 used in the third embodiment.

A third embodiment of the present invention is described below using FIGS. 8 and 9. While an example of assembling the auxiliary coil and making the appropriate connection to the power system 1 has been described in the second embodiment, the connection to the power system 1 can instead be made by, as in the present embodiment, providing an independent auxiliary power generator and connecting this generator to the power system 1 via an electric power converter 12 serving as phase control means. Elements other than this one are substantially the same as in the second embodiment, and overlapped description is omitted herein.

The power converter 12 is described below using FIG. 9. The power converter 12 includes a rectification circuit 121, which rectifies the alternating current at the side of the power generator 3, a DC link capacitor 122, which is connected across a DC output of the rectification circuit 121, a boosting chopper circuit 123, which boosts a voltage of the DC link capacitor 123, a DC link capacitor 124, which is connected to an output voltage terminal of the boosting chopper circuit 123, and a voltage-type inverter circuit 125, which converts a voltage of the DC link capacitor 124 into AC form. The power converter 12 rectifies a generated voltage V4' into a DC voltage, and then the voltage-type inverter circuit 125 converts the voltage back into the AC form. The AC voltage of the voltage-type inverter circuit 125 at this time is controlled to match to a voltage V3 in terms of voltage amplitude, frequency, and phase, thereby preventing a current from flowing.

Inserting the power converter 12 between an output terminal TS2 of the auxiliary power generator 11 and the auxiliary machine 8 makes it unnecessary to match the generated voltage and frequency of the auxiliary power generator 11 to the voltage V3 of the auxiliary-machine power transformer 6, thus allowing power-generating constants of the auxiliary power generator 11 to be selected easily. In addition, installation of the auxiliary power generator 11 becomes easy because of no need to match the phases of the AC voltages.

Furthermore, in the second and third embodiments, the electric power generated in the auxiliary coil or the auxiliary power generator is electrically coupled to the power system 1, so power-generating efficiency can be improved by supplying to the power system 1 all residual electric power, except for the power required for the driving of the auxiliary machine 8.

Fourth Embodiment

Figure 10:
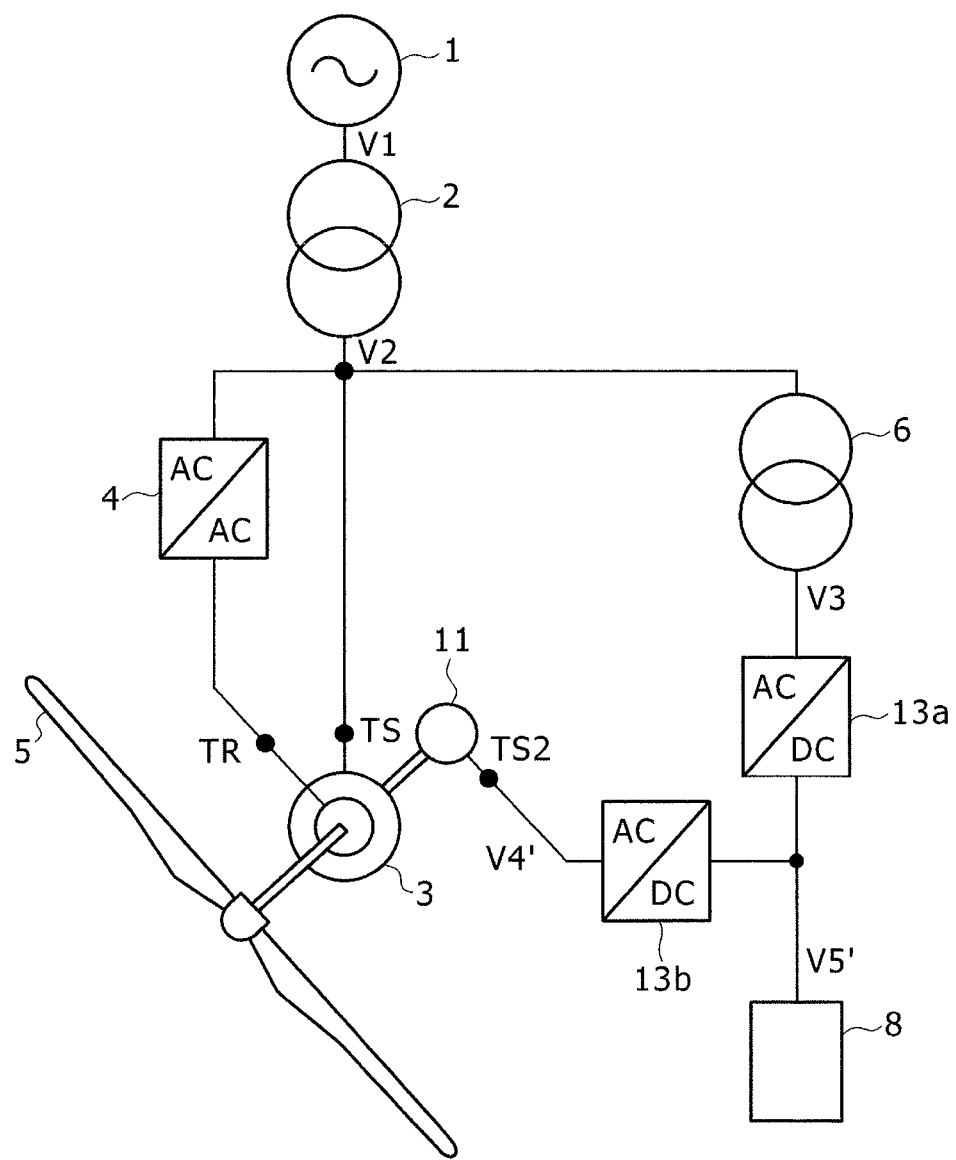
FIG. 10 is a single-line electrical diagram of a wind power generator system according to a fourth embodiment.

A fourth embodiment of the present invention is described below using FIGS. 10 and 11. The auxiliary machine 8 is connected to the low-voltage terminal of the auxiliary-machine power transformer 6 via a diode rectification circuit 13a. The output terminal TS2 of the auxiliary power generator 11 is connected to the auxiliary machine 8 via a diode rectification circuit 13b.

The connection using the diode rectification circuits 13a and 13b is described in further detail below using FIG. 11. The diode rectification circuit 13a or 13b includes a three-phase diode rectifier and a smoothing capacitor for DC voltage smoothing. A voltage across the smoothing capacitor in the diode rectification circuit 13a or 13b here is a DC terminal voltage of the diode rectification circuit. In the present invention, the DC terminal of the diode rectification circuit 13a is called a first DC terminal. Similarly, the DC terminal of the diode rectification circuit 13b is called a second DC terminal. The two DC voltage terminals are connected to each other as shown in FIG. 11, and both are further connected to a power-receiving terminal of the auxiliary machine 8. In the present embodiment, DC power is supplied to the auxiliary machine 8.

Figure 11:
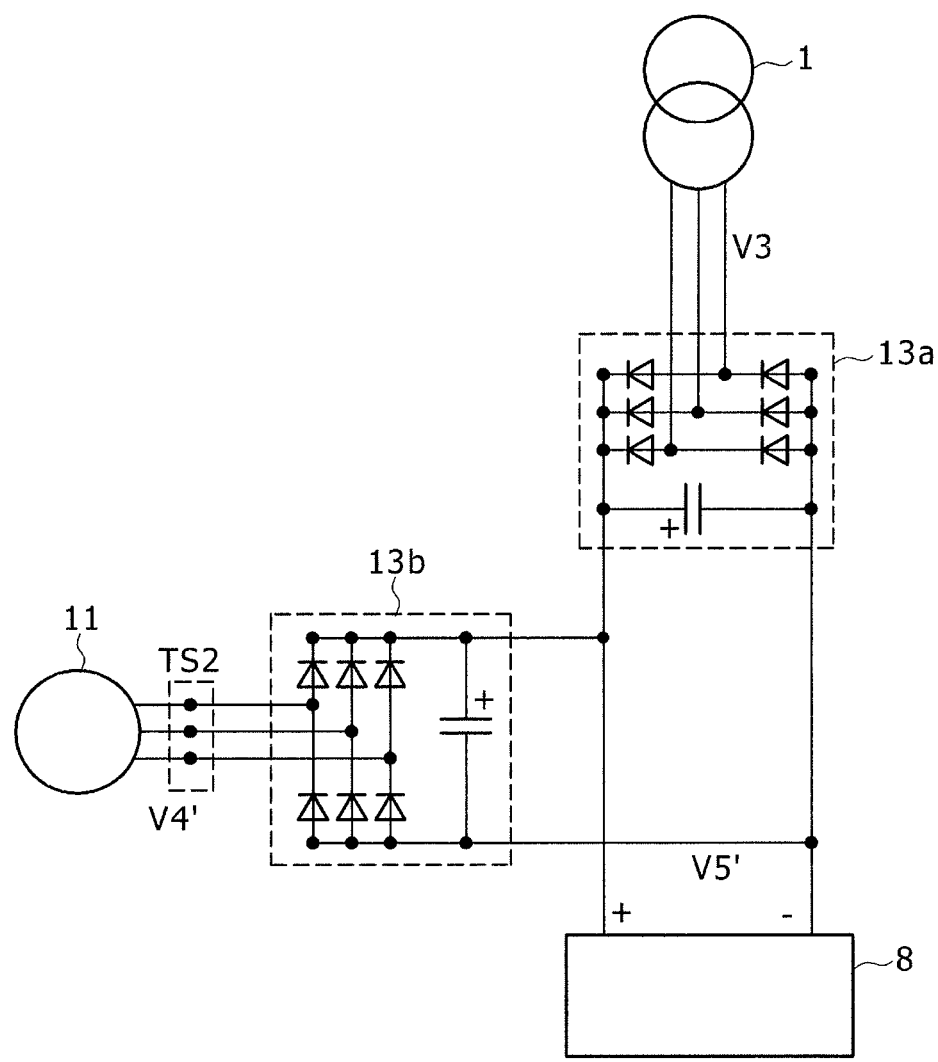
FIG. 11 is a detailed diagram of a diode rectification circuit used in the fourth embodiment.

When the diode rectification circuit 13a or 13b and the auxiliary machine 8 are connected as shown in FIG. 11, energy for driving the auxiliary machine 8 can be supplied from the terminal supplying the AC terminal voltage of the diode rectification circuit 13a or the AC terminal voltage of the diode rectification circuit 13b, whichever is the higher. A more specific example is described below.

In the present invention, power-generating constants of the auxiliary power generator 11 are selected to ensure that when the power system 1 is normal and the wind turbine is running within the wind speed range that enables power generation, a relationship in magnitude between the low-voltage terminal voltage V3 of the auxiliary-machine power transformer 6 and the voltage V4' generated by the auxiliary power generator 11 satisfies the following expression:

$$V4' > V3 \text{ (where } V3 > 0, V4' > 0)$$

Since the voltage V4' generated by the auxiliary power generator 11 is higher, the diodes in the diode rectification circuit 13a do not satisfy an electrical conduction condition and no current flows through the diodes. As a result, the driving energy for the auxiliary machine 8 is supplied from the auxiliary power generator 11. The DC voltage V5' supplied to the auxiliary machine 8 at this time is determined by V4', the higher voltage.

During this process, when the operation of the wind turbine oversteps the wind speed range that enables power generation, the voltage V4' generated by the auxiliary power generator 11 decreases, which results in the magnitude relationship between the voltage V4' and the voltage V3 reversing as follows:

$$V3 > V4'$$

Since the low-voltage terminal voltage V3 of the auxiliary-machine power transformer 6 increases above the voltage V4', the diodes in the diode rectification circuit 13b do not satisfy an electrical conduction condition and no current flows through the diodes. As a result, the driving energy for the auxiliary machine 8 is supplied from the power system 1. The DC voltage V5' at this time is determined by V3, the higher voltage.

In this case, power switching in the wind turbine also occurs when the operation of the turbine oversteps the wind speed range that enables power generation, and as in the first embodiment, this power-switching action can be accomplished without conducting a state adjustment before or after the switching action. Since there is no need to carry out a state adjustment before or after switching, this characteristic leads to smoother switching than in a case that requires power switching during power generation by the turbine.

In the present embodiment, the AC voltages of the auxiliary-machine power transformer 6 and the auxiliary power generator 11 are converted into DC voltages by the rectification circuits, and the paths of the DC voltages are both connected to the auxiliary machine 8. This makes it unnecessary to use the switch 7 or the switch 17, as in each of the embodiments described above. Because of this, the instrument transformer 71 and control device 72 required for switch control can also be omitted, which in turn simplifies the wind power generator system configuration and enhances system reliability.

Fifth Embodiment

Figure 12:
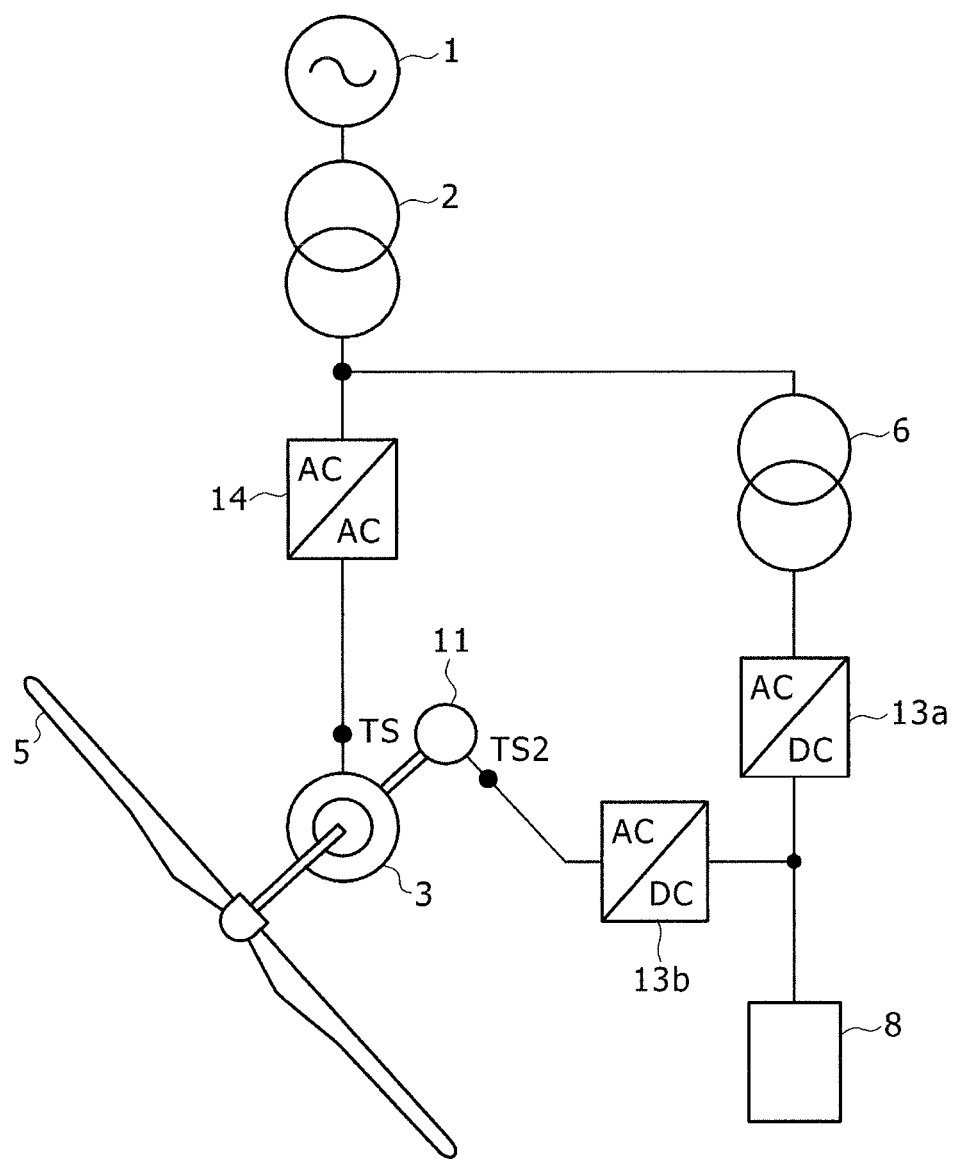
FIG. 12 is a single-line electrical diagram of a wind power generator system according to a fifth embodiment.

A fifth embodiment of the present invention is described below using FIG. 12. An excitation-type power generator has been used as the generator 3 in each of the above embodiments. The generator 3 can however be a permanent-magnet synchronous power generator, as in the present embodiment. In addition, the stator coil terminal TS of the generator 3 is connected to the low-voltage terminal of the main transformer 2 via an electric power control device 14, and thus, output voltages are controlled.

As in the present embodiment, a permanent-magnet synchronous power generator can be used as the generator 3, and this synchronous generator can be applied in each of the embodiments as well. The excitation-type power generator and permanent-magnet synchronous power generator that have been cited in this specification are only presented as examples of a generator 3, and the kind of generator 3 is not limited to those generators. The use of the permanent-magnet synchronous power generator is beneficial in that it dispenses with an excitation current.

In order to avoid complications of the single-line electrical diagrams included in part of the accompanying drawings, a switch, a disconnecting switch, a lightning arrester, a surge-absorbing element, and other elements have been omitted from those electrical diagrams, but not for a purpose of making these elements unnecessary.

In addition, although a downwind-type wind turbine has been taken as an example in the description of the embodiments, this is not intended to limit the content of the invention to the downwind type; naturally, an upwind-type wind turbine that generates electricity with a bladed rotor pointing in an upwind direction can also be applied.

DESCRIPTION OF REFERENCE NUMBERS

1 Power system
2 Main transformer
3 Power generator
4, 14 Electric power control devices
5 Bladed rotor
6 Auxiliary-machine power transformer
7, 17 Switches
8 Auxiliary machine
9 Nacelle
10 Support column
11 Auxiliary power generator
12 Electric power converter
13a, 13b Diode rectification circuits
33 Permanent-magnet synchronous power generator
71, 171 Instrument transformers
72, 172 Control devices
73, 74, 174 Switch circuits
75 Logic inverter
173 Gate driver

The invention claimed is:

1. A wind power generator system comprising:
a wind turbine including, in addition to a bladed rotor that uses wind to rotate, a power generator that generates electric power by rotating a rotor of the generator by a rotating force of the bladed rotor; and
a control device that controls the wind turbine, wherein
the power generator includes a stator coil in which supply power to an electric power system is generated, and an auxiliary coil wound around a same slot as that on which the stator coil is wound; and
the electrical energy generated from a main coil which is the stator coil, or electrical energy supplied from the electric power system, and electrical energy generated from the auxiliary coil are electrically coupled to each other, with the two of electrically coupled energy being used to drive the control device.

2. The wind power generator system according to claim 1, wherein:
the power generator is an excitation type of generator, the excitation type of generator being electrically connected to the generator itself or the electric power system and covering an excitation current by either electric power which the generator generates in itself or electric power supplied from the electric power system.

3. The wind power generator system according to claim 1, wherein:
the power generator is a permanent-magnet type of generator.

4. The wind power generator system according to claim 1, wherein:
a switch is provided between the electric power system and a position at which the electrical coupling is conducted, the switch opening or closing an element of the switch, depending upon a voltage of the electric power system.

5. The wind power generator system according to claim 4, wherein:
the switch is a thyristor switch.

6. A wind power generator system comprising:
a wind turbine including a bladed rotor that uses wind to rotate, and a power generator that generates electric power by rotating a rotor of the power generator by a rotating force of the bladed rotor;
a control device that controls the wind turbine; and
an auxiliary power generator, wherein
an AC voltage generated by the auxiliary power generator is electrically coupled under an in-phase state via phase control means to either an AC voltage generated by the power generator or an AC voltage supplied from an electric power system, the electrically coupled power being used to drive the control device.

7. A wind power generator system comprising:
a wind turbine including a bladed rotor that uses wind to rotate, and a power generator that generates electric power by rotating a rotor of the power generator by a rotating force of the bladed rotor;
a control device that controls the wind turbine;
an auxiliary coil provided on, or an auxiliary power generator connected to, the power generator;
a first rectification circuit that converts either AC power developed in the power generator, or AC power supplied from the electric power system, into DC power; and
a second rectification circuit that converts AC power developed in the auxiliary coil or the auxiliary power generator, into DC power, wherein,
the first rectification circuit includes a first AC terminal to which either the AC voltage developed in the power generator or the AC voltage supplied from the electric power system is applied, and a first DC voltage terminal to which the DC voltage obtained after the conversion is applied;
the second rectification circuit includes a second AC terminal to which the AC voltage developed in the auxiliary coil or the power generator is applied, and a second DC terminal to which the DC voltage obtained after the conversion is applied;
the first DC voltage terminal and the second DC terminal are electrically connected at a point of connection; and
the control device is connected to the point of connection and driven by the DC power obtained by any one of the rectification circuits after converting the voltage of the first AC terminal or the voltage of the second AC terminal, whichever is the higher.

8. The wind power generator system according to claim 7, wherein:
the rectification circuit is a diode rectification circuit.

* * * * *